US005980682A

United States Patent [19]

Gibson et al.

[11] Patent Number: 5,980,682

[45] Date of Patent: Nov. 9, 1999

[54] THERMAL PRINTHEAD MANUFACTURE

[75] Inventors: Bruce David Gibson; Jeanne Marie Saldanha Singh, both of Lexington, Ky.

[73] Assignee: Lexmark International, Inc., Lexington, Ky.

[21] Appl. No.: 09/078,912

[22] Filed: May 14, 1998

[51] Int. Cl.$^{6}$ .......................... B41J 2/05; B32B 31/28

[52] U.S. Cl. .......................... 156/273.3; 156/275.5; 156/278; 29/832; 29/854; 347/50; 257/736

[58] Field of Search .......................... 156/273.3, 273.5, 156/275.5, 275.7, 278; 347/50, 58; 29/832, 841, 854, 855; 257/668, 735, 736, 783; 361/707

[56] References Cited

U.S. PATENT DOCUMENTS

| | | | |
|---|---|---|---|
| 3,653,959 | 4/1972 | Kehr et al. | 522/90 |
| 4,811,081 | 3/1989 | Lyden | 357/80 |
| 4,881,318 | 11/1989 | Komuro et al. | 29/855 |
| 5,336,564 | 8/1994 | Moldavsky | 428/418 |
| 5,442,386 | 8/1995 | Childers et al. | 347/50 |
| 5,471,097 | 11/1995 | Shibata | 257/787 |
| 5,530,282 | 6/1996 | Tsuji | 257/666 |
| 5,538,586 | 7/1996 | Swanson et al. | 156/307.6 |

*Primary Examiner*—Michael W. Ball
*Assistant Examiner*—Michael A Tolin
*Attorney, Agent, or Firm*—John A. Brady

[57] ABSTRACT

Thermal heater chip (1) is located within an opening of TAB circuit tape (5) and the TAB leads (3) are welded to the chip. This assembly is turned so that the underside of the leads face upward, and a curable, electrically insulative liquid is applied and cured to form a solid (11). The bottom of the chip is then attached to a heat radiating support (7) using heat conductive adhesive. The cured solid on the leads prevents any adhesive reaching the leads from causing an electrical shunt. The resulting printhead dissipates excess heat from the chip well from the support.

3 Claims, 1 Drawing Sheet

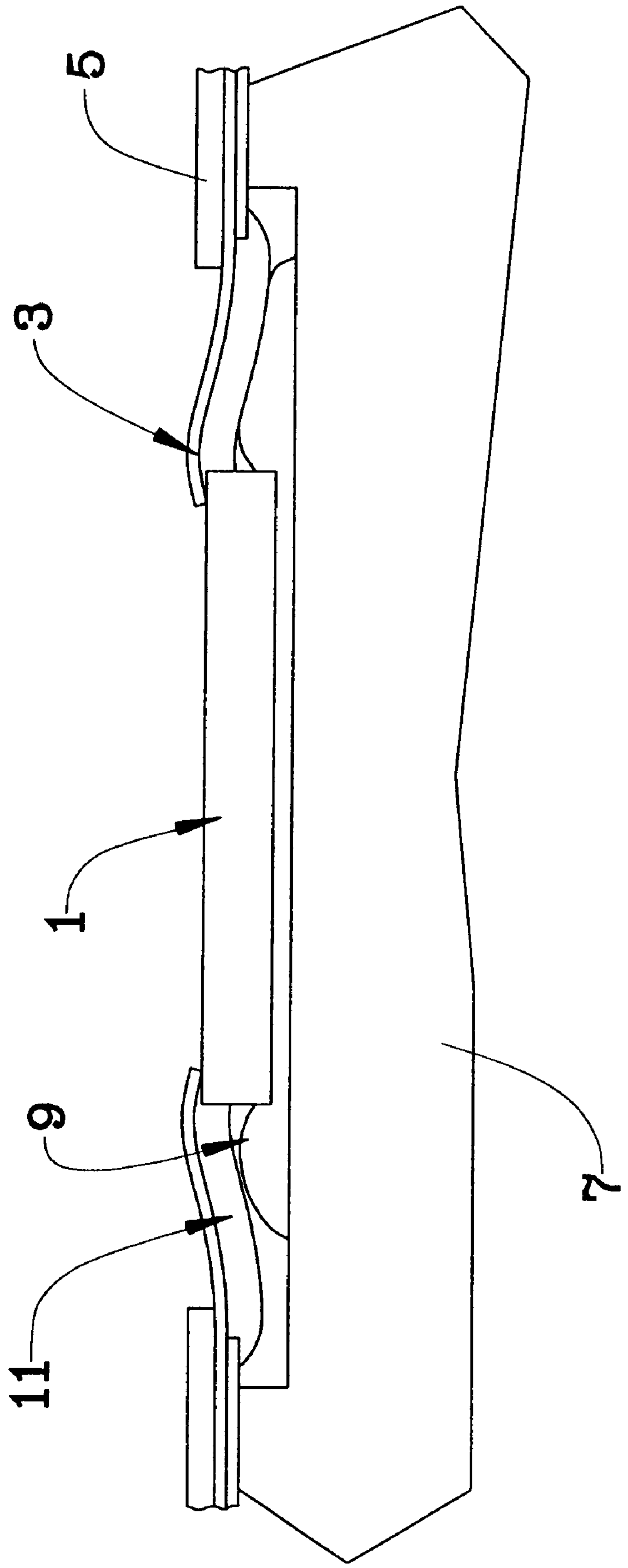
5
3
1
9
11
7

THERMAL PRINTHEAD MANUFACTURE

TECHNICAL FIELD

This invention relates to the manufacture of inkjet printheads in which semiconductor chips having heaters are mounted so as to dissipate excess heat.

BACKGROUND OF THE INVENTION

The accumulation of excess heat is a major constraint in the design of thermal inkjet printheads capable of high speed printing. The printheads have semiconductive silicon chips in which a large number of heaters are embedded elements in the chips. The heaters are selectively driven with electric current to vaporize water in the inkjet ink and thereby expel drops of ink by the force of such vapor action. As the number and speed of repetition of such operations is increased, removal of excess heat from the printhead becomes a major design objective.

This invention removes excess heat by attaching the chip to a radiator body using a thermally conductive adhesive. However, electrical leads of an electrical circuit tape (commonly known as a TAB circuit, for tape automated bonding) are also connected to the chip. Since a thermally conductive adhesive is typically electrically conductive to a significant extent, the TAB leads are first undercoated along their entire length with an insulative material.

DISCLOSURE OF THE INVENTION

Electrical leads from a circuit tape are connected to their terminal point on the chip, as by standard ultrasonic welding or other connecting technique. The entire, exposed underside of these leads are then painted with a curable material which is electrically insulative when cured. The side of the chip opposite the lead connections is then attached to a heat conductive radiator body through by a heat conductive adhesive applied between the chip and the radiator body.

BRIEF DESCRIPTION OF THE DRAWING

Details of this invention will be described in connection with the accompanying drawing, which illustrates a product made in accordance with this invention and shows the elements with which this invention is practiced.

DESCRIPTION OF THE PREFERRED EMBODIMENTS

The electrical semiconductive chip 1 may be an entirely standard thermal inkjet heater chip. As such it is a body which is primarily silicon which has a number of cavities in which a heater resistor is incorporated on the chip and which has external aluminum electrical contacts for receiving electrical signals from off the chip. As is standard, the electrical contacts are connected through the chip to select and provide heating current to selected resistors. An illustrative chip of this kind is described in technical detail in U.S. patent application Ser. No. 08/545,126, filed Nov. 19, 1995, now allowed with issue fee paid. The disclosure of this application is incorporated herein by reference.

The electrical leads 3 shown in the drawing are similarly standard in that they are thin metal elements mounted on a tape 5 and extending away from tape 5. The tape 5 is commonly known as a TAB circuit for tape automated bonding. The tape 5 has a hole in the center to receive chip 1, and the leads 3 are then connected to aluminum contacts on the surface of chip 1. This is now entirely standard electrical circuit fabrication and is done virtually entirely by robotics. The connection of leads 3 to contacts on chip 1 is typically by ultrasonic Tape Automated Bonding (TAB) welding.

Particularly when chip 1 has a large number of heaters supporting a large number of ink drops ejected by the heaters, dissipation of heat has become an important design objective. To dissipate such heat, the support body 7, on which chip 1 is mounted, is made of heat conductive material to carry heat away from chip 1. Chip 1 is connected to support 7 by an adhesive 9, which also must be heat conductive.

However, the heat conductive adhesive 9 is also inherently and significantly electrically conductive or semiconductive. This invention prevents contact between adhesive 9 and leads 3 as such contact would be a bypass or short circuit which would disable operation of chip 1.

Accordingly, the product shown in the drawing is manufactured as follows: chip 1 is located within tape 5 and leads 3 are welded to chip 1; this assembly is then located so the side of TAB beam leads 3 which reach the contacts faces up and a curable material liquid, such as heat curable or ultraviolet curable liquid, which cures to form an electrically insulative solid 11, is applied to the entire exposed under surfaces of leads 3; this coated assembly is then cured using heat, ultraviolet radiation, or other treatment suitable for the liquid used; a heat conductive adhesive 9 is then applied between chip 1 and support 7, preferably by positioning support 7 so that its surface which supports chip 1 faces upward and applying a mobile (liquid or paste) adhesive 9 to that surface of support 7 and then moving the assembly of chip 1 and tape 5 downward so that chip 1 contacts the adhesive 9. After any necessary curing to harden adhesive 9, the assembly in accordance with this invention is completed. Some adhesive 9 occasionally does reach leads 3, but the undercoating 11 on leads 3 prevents any electrical malfunction from such occurrence.

The coating to form solid 11 is applied to the leads 3 by applying a bead of the coating material from a needle tip or by brush coating by brushing along the length of each side of chip 1 where exposed leads 3 are present. The brush advantageously may be a small, pointed watercolor paintbrush.

The curable liquid which cures to form solid 11 must have good adhesion to the TAB beam leads 3; it must cure without deforming TAB beam leads; it must have good resistance to the water, dyes, organic cosolvents and other components of ink in the printhead; and it must bond to chip 1. One material as the liquid which cures to form solid 11 is FLUORAD FC-725, a heat curable product of 3M Corp. This is brushed onto the TAB beam leads 3 and the assembly of tape 5, TAB leads 3 and chip 1 are baked at 70° C. for 15 minutes. Other possible ultraviolet curable systems are UV9000, a product of Emmerson and Cummings, Specialty Polymers, a Division of National Starch and Chemicals Company, and EMCAST 7000 series, a product of EMI, Inc.

Various modifications, including the use of a wide range of suitable adhesives, will be apparent and can be anticipated. Patent protection is sought as provided by law with particular reference to the following claims.

We claim:

1. The method of making a thermal inkjet printhead assembly comprising attaching leads from an electrical circuit tape to contacts on the surface of a thermal inkjet heater chip, after said attaching leads applying a liquid, which cures to an electrically insulative solid, to the entire exposed sides of said leads which reach said contacts, after said applying a liquid curing said liquid to an electrically insulative solid which covers the entire previously exposed sides of said leads, after said curing said liquid attaching said chip to a heat conductive support body with a curable mobile adhesive which cures to a heat conducive solid, and after said attaching said chip curing said mobile adhesive to a solid, heat conductive state.

2. The method as in claim 1 wherein said liquid curing step is accomplished using heat.

3. The method as in claim 1 wherein said liquid curing step is accomplished using ultraviolet light.

* * * * *